United States Patent
Sankaralingam et al.

(10) Patent No.: US 11,151,077 B2
(45) Date of Patent: Oct. 19, 2021

(54) COMPUTER ARCHITECTURE WITH FIXED PROGRAM DATAFLOW ELEMENTS AND STREAM PROCESSOR

(71) Applicant: Wisconsin Alumni Research Foundation, Madison, WI (US)

(72) Inventors: Karthikeyan Sankaralingam, Madison, WI (US); Anthony Nowatzki, Madison, WI (US); Vinay Gangadhar, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 127 days.

(21) Appl. No.: 15/635,864

(22) Filed: Jun. 28, 2017

(65) Prior Publication Data
US 2019/0004995 A1    Jan. 3, 2019

(51) Int. Cl.
*G06F 15/82*    (2006.01)
*G06F 9/38*    (2018.01)

(52) U.S. Cl.
CPC .......... *G06F 15/825* (2013.01); *G06F 9/3851* (2013.01); *G06F 9/3877* (2013.01)

(58) Field of Classification Search
CPC ..... G06F 9/3877; G06F 9/3879; G06F 9/3881
See application file for complete search history.

(56) References Cited

U.S. PATENT DOCUMENTS

| | | | | |
|---|---|---|---|---|
| 5,933,650 | A * | 8/1999 | van Hook | G06F 5/00 712/2 |
| 8,447,957 | B1 * | 5/2013 | Carrillo | G06F 9/3455 712/14 |
| 2001/0045988 | A1 * | 11/2001 | Yamauchi | G06T 1/60 348/273 |
| 2003/0028751 | A1 * | 2/2003 | McDonald | G06F 15/7864 712/34 |
| 2006/0251092 | A1 | 11/2006 | Matterne et al. | |
| 2008/0244238 | A1 | 10/2008 | Mitu | |
| 2009/0217266 | A1 | 8/2009 | Krishnamurthy et al. | |
| 2009/0300337 | A1 | 12/2009 | Wang et al. | |
| 2012/0011349 | A1 | 1/2012 | Khailany et al. | |
| 2012/0303932 | A1 | 11/2012 | Farabet et al. | |
| 2015/0261528 | A1 | 9/2015 | Ho et al. | |
| 2015/0268963 | A1 | 9/2015 | Etsion et al. | |
| 2017/0024167 | A1 | 1/2017 | Lavasani | |

OTHER PUBLICATIONS

Tony Nowatzki, Vinay Gangadhar, and Karthikeyan Sankaralingam. 2015. Exploring the potential of heterogeneous von neumann/dataflow execution models. SIGARCH Comput. Archit. News 43, 3 (Jun. 2015), 298-310. (Year: 2015).*

(Continued)

*Primary Examiner* — Keith E Vicary
(74) *Attorney, Agent, or Firm* — Boyle Fredrickson, S.C.

(57) ABSTRACT

A hardware accelerator for computers combines a stand-alone, high-speed, fixed program dataflow functional element with a stream processor, the latter of which may autonomously access memory in predefined access patterns after receiving simple stream instructions and provide them to the dataflow functional element. The result is a compact, high-speed processor that may exploit fixed program dataflow functional elements.

17 Claims, 6 Drawing Sheets

(56) References Cited

OTHER PUBLICATIONS

T. Nowatzki, V. Gangadhan, K. Sankaralingam and G. Wright, "Pushing the limits of accelerator efficiency while retaining programmability," 2016 IEEE International Symposium on High Performance Computer Architecture (HPCA), Barcelona, Mar. 2016, pp. 27-39. (Year: 2016).*

Gangadhar et al. (Gangadhar) (An Efficient Architectural Realization of a Specialization Engine for Neural Networks With General-Purpose Programmability); 21 pages (Year: 2015).*

International Search Report dated Sep. 27, 2018; 16 pages.

Venkatesh et al."Conservation cores: reducing the energy of mature computations," In ACM SIGARCH Computer Architecture News, vol. 38, No. 1, pp. 205-218. ACM, 2010. US.

Fan et al. "Increasing hardware efficiency with multifunction loop accelerators." In Hardware/Software Codesign and System Synthesis, 2006. CODES+ISSS'06. Proceedings of the 4th International Conference, pp. 276-281. IEEE, 2006. US.

Cilviu Ciricescu et al.; "The reconfigurable streaming vector processor (RSVPTM)." In Proceedings of the 36th annual IEEE/ACM International Symposium on Microarchitecture, pp. 1-10; IEEE Computer Society, 2003. US.

Angshuman Parashar et al.; "Triggered instructions: A control paradigm for spatially-programmed architectures." In ACM SIGARCH Computer Architecture News, vol. 41, No. 3, pp. 142-153. ACM, 2013. US.

Brucek Khailany et al.; "Imagine: Media processing with streams." IEEE micro 21, No. 2 (2001): pp. 35-46. US.

N. Clark et al.; "Optimode: Programmable accelerator engines through retargetable customization," in Hot Chips 16; pp. 1-19; Aug. 2004; Michigan.

J. B. Dennis et al.; "A preliminary architecture for a basic-flow processor," in Proceedings of the 2Nd Annual Symposium on Computer Architecture, ser. ISCA '75. New York, NY, USA: ACM, 1975, pp. 126-132.

V. Govindaraju et al.; "Dynamically specialized datapaths for energy efficient computing," in High Performance Computer Architecture (HPCA), 2011 IEEE 17th International Symposium on, 2011, pp. 503-514; Madison, WI.

A. Lukefahr et al.; "Composite cores: Pushing heterngeneity into a core," in Proceedings of the 2012 45th Annual IEEE/ACM International Symposium on Microarchitecture, ser. MICRO '12. Washington, DC, USA: IEEE Computer Society, 2012, pp. 317-328.

A. Parashar et al.; "Triggered instructions: A control paradigm for spatially-programmed architectures," in Proceedings of the 40th Annual International Symposium on Computer Architecture, ser. ISCA'13. New York, NY, USA: ACM, 2013, pp. 142-153.

K. Sankaralingam et al.; "Exploiting ILP, TLP and DLP with the Polymorphous TRIPS Architecture," in ISCA '03: Proceedings of the 30th Annual International Symposium on Computer Architecture, Jun. 2003, pp. 422-433; Austin, TX.

J.E. Smith; "Decoupled access/execute computer architectures," in Proceedings of the 9th Annual Symposium on Computer Architecture,ser. ISCA '82. Los Alamitos, CA, USA: IEEE Computer Society Press, 1982, pp. 112-119.

* cited by examiner

FIG. 10

COMPUTER ARCHITECTURE WITH FIXED PROGRAM DATAFLOW ELEMENTS AND STREAM PROCESSOR

STATEMENT REGARDING FEDERALLY SPONSORED RESEARCH OR DEVELOPMENT

This invention was made with government support under CNS1218432 awarded by the National Science Foundation. The government has certain rights in the invention.

CROSS REFERENCE TO RELATED APPLICATION

--

BACKGROUND OF THE INVENTION

The present invention relates to electronic computer architectures and in particular to a high-speed computer accelerator having a limited functionality but improved applicability.

Computer accelerators provide special-purpose circuitry that can be teamed with a general-purpose central processing unit (CPU) to provide improved performance in some computational applications.

Early computer accelerators expanded the hardware instruction set of the general-purpose processor with off-chip circuitry providing pre-programmed functions, that is, functions receiving data to execute a predetermined function on that data. These accelerators will henceforth be termed "fixed function" accelerators referring to the fact that they execute one or more fixed functions. One example of such fixed-function accelerators was the so called "math coprocessor" providing specialized circuitry to execute predetermined floating-point and trigonometric function calculations. Such fixed-function accelerators are easily integrated into programming to the extent that their features can be invoked with a single program instruction requiring little more than the transfer of the necessary argument data and return of the calculated value.

As the power and speed of general-purpose processors increased, many fixed-function accelerators were rendered obsolete to the extent that their limited performance gains were outweighed by the cost of the second integrated circuit and the computational burden of transferring data and control between the general-purpose processor and the accelerator.

Possibly for this reason, current accelerator technology has largely focused on accelerators that operate as independently functioning special-purpose computers executing large blocks of instructions independent of the general processor. One example of a computer architecture accelerator is a graphic processor unit (GPU) which provides an array of special-purpose computer cores adapted to the specific time-consuming tasks associated with rendering graphics. Similar accelerators of this type of accelerator include application-specific accelerators such as the Microsoft Catapult FPGA accelerator, for use in data centers, and Google's Tensor processing unit for distributed machine learning. These accelerators are effectively special-purpose computers which, when combined with a general-purpose, high-performance von Neumann processor, for example, can greatly increase processing speed for these specific applications.

The design of computer architecture accelerators may not be practical for applications that are not associated with well-established problems or that do not have a sufficiently large demand to justify the time and expense of complex designs, changes to application programs, and changes to tool chains needed to use these accelerators.

SUMMARY OF THE INVENTION

The present invention provides a fixed-function accelerator that can substantially increase computational speeds for tasks that don't justify the design and manufacture of computer architecture accelerators. Speed advantages in executing the fixed functions is provided by using a high-speed dataflow architecture and by using a special-purpose stream processor to handle memory accesses, allowing long runs of data to be processed without involvement by the general-purpose processor. Proper selection of the individual functions implemented can give the accelerator broader applicability to a range of programs. Implementing different fixed functions can reuse substantial portions of the architecture and the fixed functions are relatively simple to invoke from programs.

Specifically then, in one embodiment, the invention provides computer accelerator architecture having (1) a lower complexity processor adapted to receive stream instructions from a higher complexity general-purpose processor, the stream instructions describing a logical stream of multiple data elements to be exchanged with a memory; (2) a fixed program functional element to sequentially process successive input data elements of a logical stream, as initiated by availability of each input data element, to provide resultant output data elements of a logical stream; and (3) a stream processor receiving the stream instructions from the lower complexity general-purpose processor to autonomously read the input data elements of a logical stream from the memory according to the stream instructions and to autonomously write resultant output data elements of a logical stream to memory according to stream instructions. A pair consisting of only a single stream processor and only a single functional element operates to intercommunicate data elements of a given logical stream.

It is thus a feature of at least one embodiment of the invention to provide an accelerator that offers the versatility and wide applicability of a fixed-function accelerator, while still providing substantial speed advantages over execution of the same functions on sophisticated general-purpose processors.

The fixed program functional element may not include a program counter.

It is thus a feature of at least one embodiment of the invention to employ dataflow architecture to provide substantial speed gains in function execution.

The fixed program functional element may provide a multiply add-reduction function having at least one output that is a first sum of a pair of second sums, each second sum being a sum of a pair of products, the products being products of a pair of input arguments.

It is thus a feature of at least one embodiment of the invention to provide a fixed-function accelerator implementing the common map-reduce function.

Alternatively, or in addition, the fixed program functional element may be a multiply accumulate function having at least one output that is a running total of a product of a pair of input arguments.

It is thus a feature of at least one embodiment of the invention to provide a fixed-function accelerator implementing the common map-unit function.

Alternatively, or in addition, the fixed program functional element may be a nonlinear transformation function having an output that is a base value summed to an interpolated value, where the base value is obtained from a first lookup table from the most significant bits of an input argument and the interpolated value is a slope value obtained from a second lookup table from the most significant bits of the input argument times the least significant bits of the input argument.

The computer accelerator may include multiple functional elements and a switch assigning a single functional element at a time to the stream processor. Alternatively, or in addition, the computer accelerator may include multiple stream processors and multiple functional elements and a switch assigning a single functional element to a single stream processor.

It is thus a feature of at least one embodiment of the invention to increase the flexibility of the computer accelerator by allowing a selection among various functions that may be used for acceleration.

The functional elements provide for processing at least thirty-two bit arguments and may process in parallel separate data words having a length smaller than an argument length of the functional element by concatenating the separate data words together and processing them as an argument.

It is thus a feature of at least one embodiment of the invention to permit, single instruction, multiple data type parallel processing.

The stream processor may simultaneously exchange multiple streams with a given fixed program functional element.

It is thus a feature of at least one embodiment of the invention provide multiple streams to the functional elements for maximum throughput and utilization of the memory bandwidth.

The stream instructions from the lower complexity general-purpose processor to the stream processor may be received asynchronously with respect to the operation of the functional element and provide for autonomous reading of multiple input values stored in memory or an autonomous writing of multiple output values from the accelerator according to different predefined memory access patterns.

It is thus a feature of at least one embodiment of the invention to permit parallel execution of memory access instructions and calculations for improved acceleration.

The lower complexity general-purpose processor may be adapted to receive instructions and data from the higher complexity, general-purpose processor to execute logical and arithmetic instructions and return the results to the higher complexity, general-purpose processor.

It is thus a feature of at least one embodiment of the invention to permit the functional element to be incorporated into more complex accelerator functions implemented by the lower complexity, general-purpose processor or to allow the lower complexity, general-purpose processor to accept off-loaded functions directly.

The stream processor may provide pre-defined memory access patterns including a linear access pattern of contiguous addresses between two memory addresses and a strided access pattern of regularly spaced discontiguous addresses between two memory addresses.

It is thus a feature of at least one embodiment of the invention to provide memory access patterns commonly used in multiple data instructions suitable for acceleration.

These particular objects and advantages may apply to only some embodiments falling within the claims and thus do not define the scope of the invention.

DETAILED DESCRIPTION

Figures 1, 2:
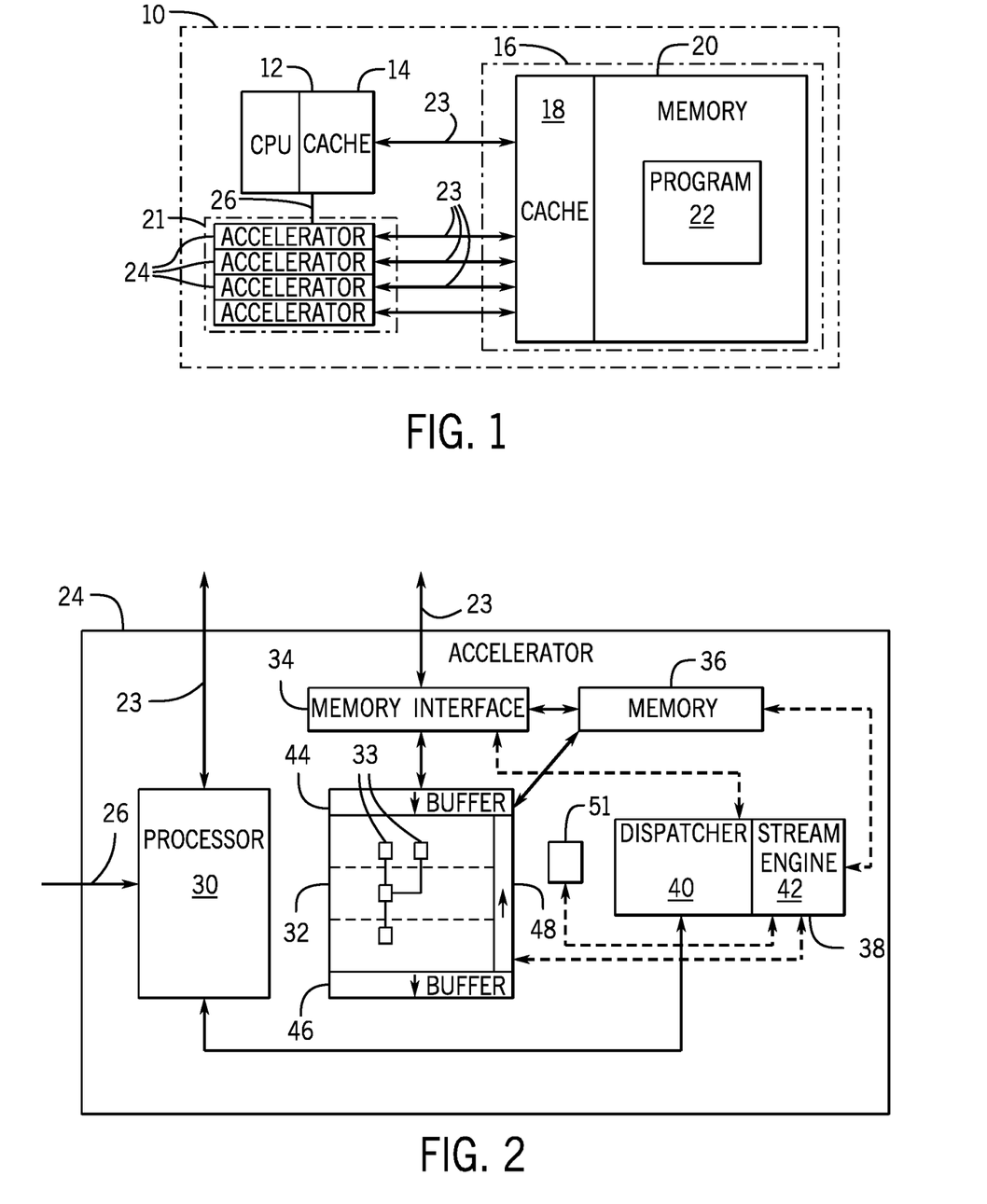
FIG. 1 is a simplified block diagram of the accelerator of the present invention providing a bank of accelerators usable with a general-purpose processor.
FIG. 2 is a detailed block diagram of a single accelerator showing the combination of a lower complexity general-purpose processor, a fixed program functional element, scratchpad memory and a stream processor.

Referring now to FIG. 1, a computer architecture 10 constructed according to the present invention may provide for a higher complexity general-purpose processor 12. The higher complexity general-purpose processor 12, for example, may implement a sophisticated von Neumann architecture including out-of-order execution and speculative execution using a rich instruction set of arithmetic and logical instructions sequenced with a program counter. Examples of such processors 12 include those manufactured by the Intel Corporation under the trade name of "i7" as well as similar devices manufactured by Advanced Micro Devices, Inc., and ARM Ltd. As used herein, "general-purpose" refers to a general-purpose instruction set and architecture sufficient to execute a wide range of programs, for example, such as could be executed at least by an Intel 8080 or subsequent processor in this family.

The higher complexity general-purpose processor 12 may communicate through an L1 cache 14 with a memory system 16 using address and data lines 23. The memory system 16 provides a standard memory hierarchy including but not limited to additional levels of cache 18 coupled with one or more layers of increasingly larger scale memory 20, for example, composed of random access memory (RAM), disk memory and the like.

The memory system 16 may hold a program 22 for execution by the computer architecture 10 such as may benefit from hardware acceleration, for example, including image processing, machine learning, graph processing or the like.

The higher complexity general-purpose processor 12 may also communicate with a bank 21 of computer accelerators 24 by means of control lines 26 sending data that describe a pattern of memory access for obtaining argument data for the function of the computer accelerator 24 and a similar pattern for writing values back from the fixed-function accelerators 24. The control lines 26 may also send timing information initiating operation of the fixed-function accelerators 24. Control lines 26, as well as defining the memory access pattern and timing signals may provide for some limited configuration data, for example, selecting among different fixed-function circuits available in the computer accelerator 24.

As will be discussed in greater detail below, during operation, the fixed-function accelerators 24, using the memory data pattern provided by the higher complexity general-purpose processor 12, may independently access the memory system 16 at the L2 cache using similar address and data lines 23 without further assistance of the higher complexity general-purpose processor 12. This access may be moderated by a load-balancing circuit to eliminate deadlock by ensuring each computer accelerator 24 obtains sufficient access to memory system 16, for example, using conventional deadlock elimination techniques. During operation of the fixed-function accelerators 24, the higher complexity general-purpose processor 12 may shut down or be used for other tasks during that calculation.

Referring now to FIG. 2, each computer accelerator 24 includes a lower complexity general-purpose processor 30, a fixed-function element 32, a memory interface 34, scratchpad memory 36 and a stream processor 38, the latter including a stream dispatcher 40 and a stream engine 42.

Lightweight Processor

During operation, the lower complexity general-purpose processor 30 communicates with the higher complexity general-purpose processor 12 to receive instructions therefrom and issue stream instructions to the stream processor 38. The stream processor 38 in turn will control the memory interface 34 to obtain information necessary for calculation by the fixed-function element 32 (either directly or through the scratchpad memory 36) and to return information after that calculation to the memory interface 34 for storage (again either directly or through the scratchpad memory 36).

In this regard lower complexity, general-purpose processor 30 may be less complicated and/or slower than the higher complexity general-purpose processor 12 as is sufficient to provide coordination of the other components of the computer accelerator 24. For example, the lower complexity general-purpose processor 30 may be a von Neumann, single-issue, in-order core without speculative execution executing basic arithmetic and logical functions. In this regard, the lower complexity general-purpose processor 30 will require much less integrated circuit area than the higher complexity general-purpose processor 12 and will use much less power. In some embodiments, the lower complexity general-purpose processor 30 may be implemented with discrete circuitry and a fixed program and thus may not necessarily employ programmable computer architecture. The lower complexity general-purpose processor 30 and memory interface 34 may share the same memory access or, as depicted, may provide for separate memory access channels.

Fixed-Function Unit

The fixed-function element 32 may include multiple input vector buffers 44, output vector buffers 46, and transfer vector buffers 48 for communicating arguments to and values from the fixed-function element 32 or in a loop around the fixed-function element 32. One or more indirect transfer vector buffers 51 may also be present of comparable size.

Figure 6:
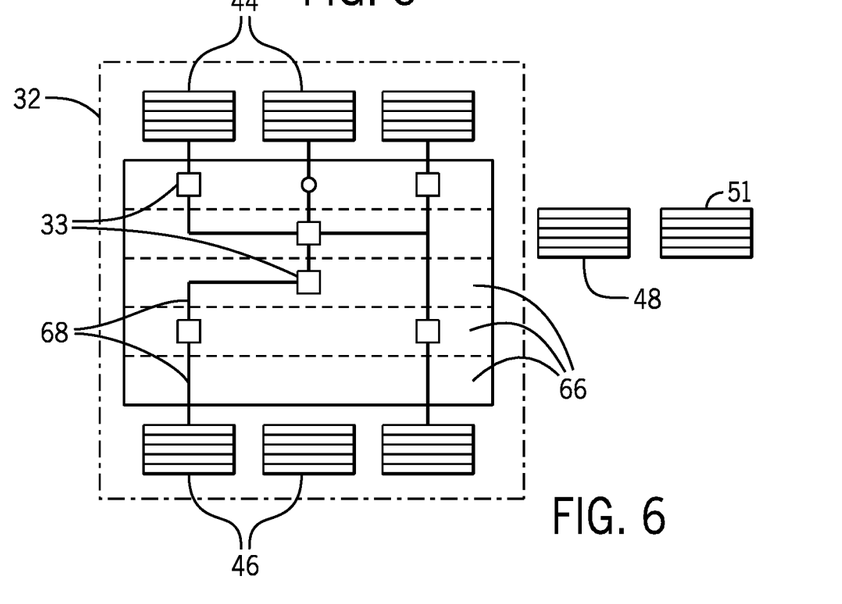
FIG. 6 is a logical block diagram of a functional element of FIG. 2 showing associated vector buffers and dataflow coordination.

Referring now to FIG. 6, the fixed-function elements 32 provide a set of interconnected function primitives 33, for example, but not limited to, those providing addition, multiplication, accumulation, and lookup tables. Each of these function primitives 33 may receive data from a corresponding input vector buffer 44 and provide results to corresponding output vector buffers 46 with possible movement of data through transfer vector buffer 48 in multiple cycles. Generally, the architecture of the fixed-function elements 32 will be that of a dataflow architecture meaning that they begin execution upon the availability of data in the input vector buffers 44 using, for example, a circuit identifying whether corresponding data is present at inputs of each of the function primitives 33.

Data flows through the function primitives 33 in a deterministic manner according to stages 66 eliminating race conditions which may be enforced either by a clocking mechanism or by providing similar delays (for example, enforced through no operation function primitives which perform no operation but delay) along each data path 68 between the function primitives 33. By operating without a program counter, extremely high-speed performance can be obtained providing calculations as fast as data is delivered to the input vector buffers 44. In addition, it will be understood, that the dataflow pathway between the function primitives 33 forms an effective pipeline so that early stages 66 of the fixed-function element 32 may be receiving new data from the input vector buffers 44 as data is being processed in the later stages 66.

Generally, function primitives 33 will provide for predication, limiting the need for unnecessary control steps and may operate in parallel on multiple data words concatenated together to form a single argument passing through the function primitives 33. Thus, for example, a function primitive 33 having an argument width of 32 bits may simultaneously process four 8-bit arguments concatenated together, for example, by performing saturation arithmetic in which carries and overflows are handled, for example, by suppressing the carry or overflow and setting the result to the highest permissible value. A similar technique can be used with underflows and borrows that setting the result to the lowest permissible value.

Figure 7:
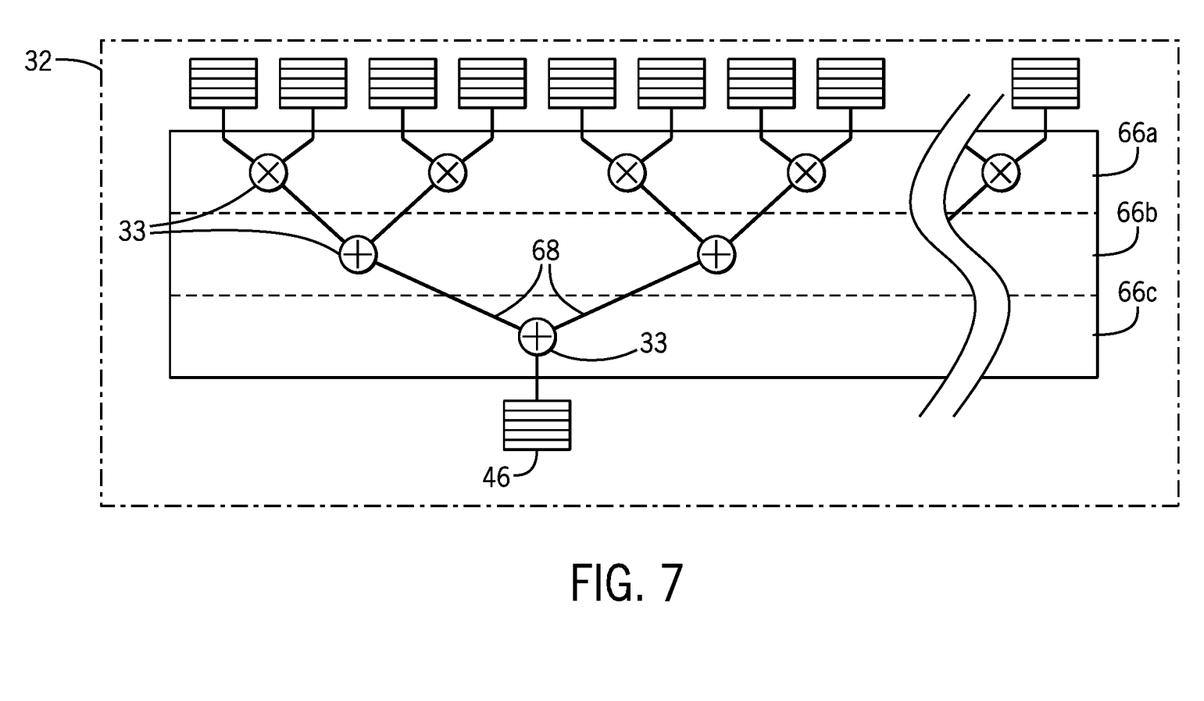
FIG. 7 is a figure similar to that of FIG. 6 showing a map reduce functional element.

Referring now to FIG. 7, an important fixed-function element 32 may provide for a map reduce or multiply add-reduction function. In such a function, arguments at pairs of input vector buffers 44 may be multiplied in a first stage 66a by multiply function primitives 33 providing the mapping. Output products from the multiply function primitives 33 are then added pairwise together at a second stage 66b providing a first part of the reduction by additional adder function primitives 33. Outputs from this second set of adder function primitive 33 are then summed at a third stage 66c by an additional adder primitive 33 which provides its output to output vector buffer 46 completing the reduction. It will generally be understood that the map-reduce function may implement a variety of different mapping procedures including, for example, multiplication, absolute difference, and the like, and may provide a variety of different reduction functions including, for example, addition, maximum, and minimum functions, and the like.

Figure 8:
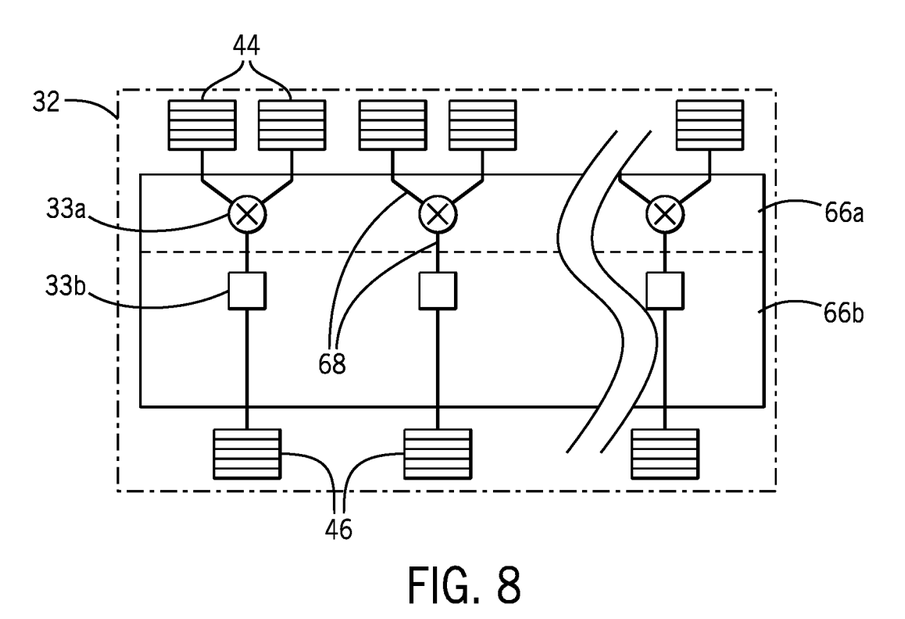
FIG. 8 is a figure similar to that of FIGS. 6 and 7 showing a map unit functional element.

Alternatively, or in addition, as shown in FIG. 8, fixed-function element 32 may provide for a map unit or multiply-and-accumulate function. In such a function, arguments at pairs of input vector buffers 44 may be summed at a first stage 66a by adder function primitives 33a. Outputs of these adder function primitives 33a are provided to accumulator function primitives 33b at a second stage 66b which sums each current output to a running total of previous outputs for a predetermined number of arguments. The accumulator function primitives 33b then provide outputs to output vector buffers 46.

Figure 9:
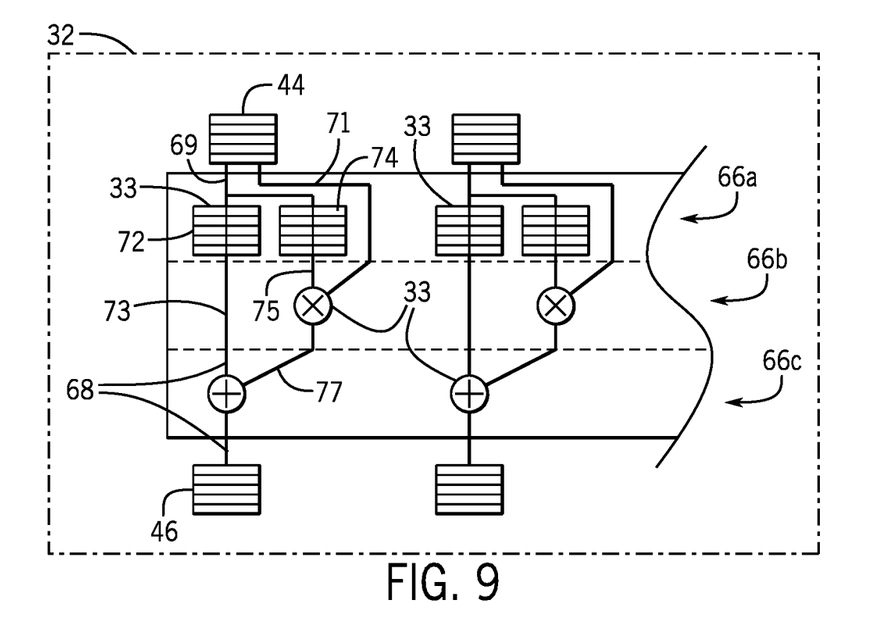
FIG. 9 is a figure similar to that of FIGS. 6, 7, and 8 showing a nonlinear transformation functional element.

Alternatively, or in addition, as shown in FIG. 9, the fixed-function element 32 may provide for a nonlinear transformation or piecewise linear approximation. At a first stage 66a values from input vector buffers 44 are split into high-order bits 69 used to determine base values and low-order bits 71 used for interpolation. The high-order bits 69 are received by a base lookup table 72 which converts the high-order bits 69 to a base value 73 of the transformation according to a transformation function embedded in the lookup table 72, for example, at the time of manufacture or configuration. The high-order bits 69 are also sent to second lookup table 74 producing a slope value 75 for the transformation function. The slope value 75 is multiplied by low-order bits 71 at a next stage 66b and the resulting interpolated value 77 is then summed to the base value at a succeeding stage 66c to provide an output to output vector buffer 46.

Generally, the fixed-function element 32 does not provide a program counter and may or may not require control-flow instructions. For example, control-flow may be implicit in the interconnection 68 of the function primitives 33. Alternatively, or in addition, control-flow may be provided by the fixed-function elements 32, for example, internally implementing branch instructions and selecting among physical interconnections. Calculations occur as soon as operands are available within the constraint of the regular sequencing through the fixed-function elements 32 which may occur at high speed. The fixed-function elements 32 may receive data, for example, configuring the lookup table 74 but do not receive instructions providing an ordered set of execution steps according to instruction type.

Stream Processor

Referring to FIGS. 2 and 6, each of the input vector buffers 44 and output vector buffers 46 of the fixed-function element 32 provide first-in, first-out buffers that may be filled asynchronously or emptied asynchronously to the processing performed by the fixed-function element 32 under the control of the stream processor 38. The vector buffers thus provide for independent but parallel data acquisition and data processing. In one embodiment, each buffer may provide eight, sixty-four bit words, thus being 8×64 wide, and have an arbitrary depth, for example, greater than 10 and optionally 100. Additional similar indirect transfer vector buffers 51 of similar construction and independent of input vector buffers 44 and output vector buffers 46 may be used for storing streaming addresses for indirect loads and stores if required.

In essence, the stream processor 38 provides a state machine that can move data autonomously between the memory system 16 and another storage location once it receives program instructions from the lower complexity general-purpose processor 30. Generally, the stream processor 38 will move input data from the memory system 16 to either the scratchpad memory 36 or from the scratchpad memory 36 to the input vector buffers 44, or may move output data from the scratchpad memory 36 to the memory system 16, or from output vector buffers 46 to the scratchpad memory 36 or the memory system 16 according to a predefined pattern. In this regard, the stream processor 38 may provide for three separate circuits, one for memory, one for scratchpad, and one for controlling re-cycling of data from output port to input port and also the generation of constant values. These three circuits may operate independently (but for synchronization through the memory interface 34) for high-speed operation.

Figure 3:
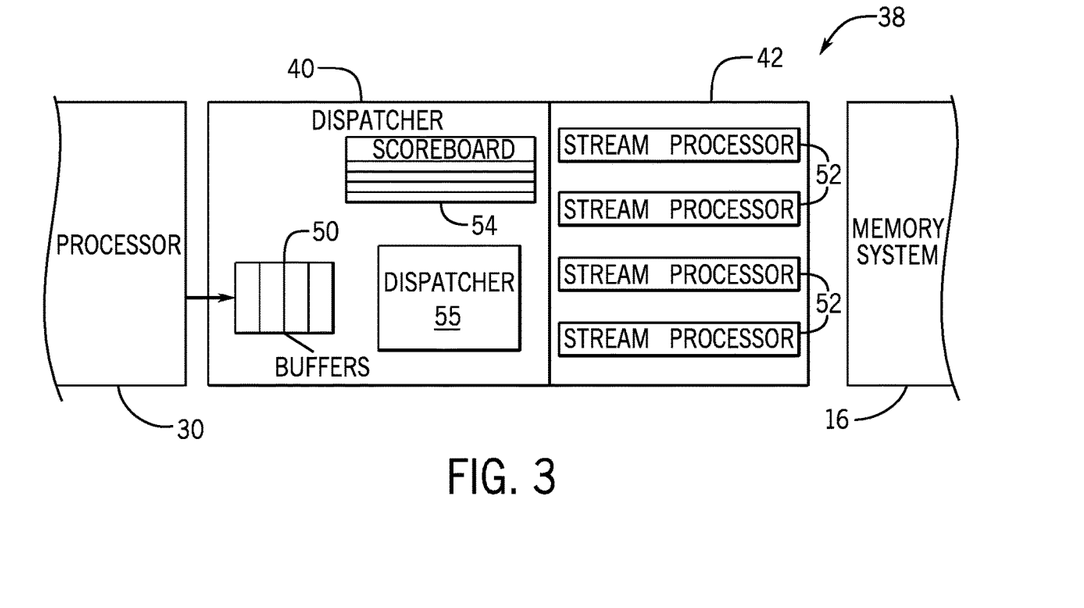
FIG. 3 is a detailed block diagram of the stream processor showing constituent stream dispatcher and stream engine elements.

Referring now to FIG. 3, more specifically, the stream processor 38 may include a stream dispatcher 40 and stream engine 42. The stream dispatcher 40 receives a set of stream instructions at a stream queue 50 from the lower complexity general-purpose processor 30, these instructions defining a pattern of access of the memory system 16 to obtain data elements to be processed by the fixed-function element 32 (shown in FIG. 2). These queued stream instructions will ultimately be sent to one of a set of stream engines 52 in the stream engine 42 for concurrent execution.

Each stream engine 42 may handle the necessary protocol for communicating (reading or writing data) with the memory system 16 and provides the ability to calculate a set of addresses to obtain a stream of such data according to the stream instructions for processing by the fixed-function element 32. To the extent that the accelerator 24 may communicate directly with an L2 cache 18 (as shown in FIG. 1) the stream engine 42 may handle memory coherence problems, for example, by sending a tag invalidation to the lower complexity general-purpose processor 30 whenever a stream crosses a page boundary. The L1 cache 14 and L2 cache 18 may be assumed to be using virtual addresses when virtualization is employed. Necessary address translation using a translate lookaside buffer of an MMU is accomplished according to techniques understood in the art.

Stream instructions from the stream queue 50 will only be dispatched to the stream engines 52 by a dispatcher 55 when the necessary resources needed for the stream are available and according to the program order of program 22. The critical resources needed for a stream include availability of the input vector buffer 44 and output vector buffer 46 or of the scratchpad memory 36.

The dispatcher 55 determines availabilities of resources using a scoreboard 54 which provides a state of each stream resource as either "taken" "free," or "all requests in flight" which may be updated by the dispatcher 55, A critical resource moves from "free" to "taken" when the stream instructions are enrolled in the stream engines 52. The given stream of those instructions then logically owns the resource while in flight. When the stream is finished, the associated stream engine 52 in the stream engine 42 notifies the stream dispatcher 40 to update the scoreboard 54 to show the resource is in the free state. The "all requests in flight state" indicates that all requests for the memory stream are completely sent to the memory system 16 but have not arrived. This state allows scheduling of another conflicting stream enabling two stream engines 52 to use the same critical resources in overlapping configuration for additional efficiency.

The stream processor 38 may also control the forwarding of streams to the stream engines 52 according to barrier instructions that may be issued by the lower complexity general-purpose processor 30. Barrier instructions prevent the issuance of new stream instructions to the stream processors until a given stream identified by the barrier instruction is complete. Thus, barrier instructions provide a method of ensuring proper execution order of the calculations performed by the fixed-function elements 32.

Generally, then, stream instructions will include: stream instructions for providing a stream of data to or from the fixed-function element 32 without involvement of the lower complexity general-purpose processor 30 or the higher complexity general-purpose processor 12; and barrier instructions used to enforce some degree of serialization of access of data by the stream processor 38 as will be discussed below. Examples of these stream instructions (shown in Table I) provided by the lower complexity general-purpose processor 30 to the stream processor 38 generally identify a source of data, destination data, and the data pattern as follows:

TABLE I

Example Stream Instructions

| Command Name | Parameters | Description |
|---|---|---|
| SD_Mem_Scr | Source Memory Address, Access Size, Stride Length, Number of Strides, Destination Scratchpad Address | Read from memory system 16 to the scratchpad memory 36 using the indicated access pattern |
| SD_Scr_Port | Source Scratchpad Address, Access Size, Stride Length, Number of Strides, Input Port Number | Read from scratchpad memory 36 to the designated input vector buffer 44 using to the indicated pattern |
| SD_Mem_Port | Source Memory Address, Access Size, Stride Length, Number of Strides, Input Port Number | Read from memory system 16 to the designated input vector buffer 44 using the indicated pattern |
| SD_Const_Port | Constant Value, Number of Elements, Destination Port Number | Send a series of constant values to the designated input vector buffer 44 |
| SD_Chuck_Port | Number of Elements, Source Port Number | Eject a defined series of values from a queue 50 of the designated transfer vector buffer 48 |
| SD_Port_Port | Source Port Number, Number of Elements, Destination Port Number | Recirculate a defined series of values from the designated transfer vector buffer 48 to the designated input vector buffer 44. |
| SD_Port_Scr | Source Port Number, Number of elements, Destination Scratchpad Address. | Write a defined series of values from the designated transfer vector buffer 48 to scratchpad memory 36 |
| SD_Port_Mem | Source Port Number, Access Size, Stride Length, Number of Strides, Destination Memory Address. | Write from the designated transfer vector buffer 48 to memory system 16 using the indicated pattern |
| SD_IndPort_Port | Indirect Port Number, Offset Address, Destination Port Number | Indirect load from memory system 16 based on address data in designated indirect transfer vector buffer 51 for storage in designated destination port |
| SD_IndPort_Mem | Indirect Port Number, Offset Address, Destination Port Number | Indirect store to memory system 16 based on address in indirect port from designated output port |

These instructions transfer data between storage locations autonomously using a designated pattern as will be discussed below.

Indirect addressing of data by the stream engine 52 is possible using stored data (for example, in an indirect transfer vector buffer 51) as an address value. In indirect addressing, data, for example, from the streaming pattern, is used as the address to obtain further data that is operated on by the fixed-function element 32. This indirect addressing effects pointers, useful, for example, when accessing the rows of a sparse matrix. The stream processor 38 may provide capability to facilitate indirect access by chaining two streams together, the first stream for accessing a contiguous or strided pattern of pointers, and subsequent streams to load those pointers' values from the memory system 16 and deliver them to the reconfigurable faxed-function element 32. Additional instructions are provided to generate constant values (rather than loading these from memory) and to discard unused output values (as opposed to loading them into nonfunctional memory areas).

Generally, each of these instructions may be optionally issued directly by the higher complexity general-purpose processor 12 as part of the instruction set architecture of the accelerator and the data in these instructions used with minimal processing by the lower complexity general-purpose processor 30 to control other components of the accelerator.

Figure 10:
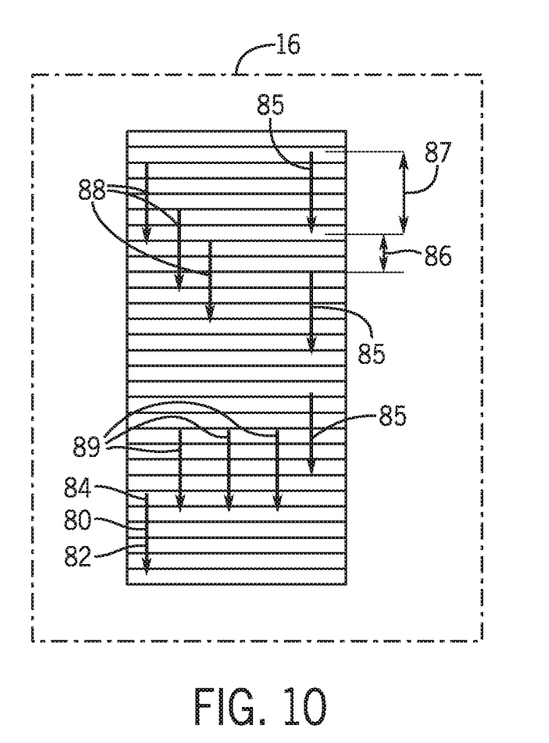
FIG. 10 is a diagrammatic representation of computer memory showing definable memory access patterns for autonomous access by the stream processor.

Referring now to FIG. 10, using data from the above instructions, the stream processor 38 provides a state machine for autonomous loading or writing data between storage locations using predefined patterns of memory access. The simplest pattern is a linear pattern 80 that reads (or writes) sequentially every memory address between a starting address 82 and ending address 84 designated by the instruction. This pattern is indicated by setting the stride length equal to zero. The starting address is designated in the above instructions as the source address for reads and the destination address for writes while the ending address is indicated either by providing an actual ending address or the necessary data to calculate an ending address for example the number of elements when the source is a port or a product of the access size times the stride length times the number of strides added to the starting address when the source is the memory or scratchpad.

Alternatively, the stream processor 38 may be programmed to use a strided pattern 85 by setting the stride length equal to a nonzero value which describes a gap or stride 86 in addresses between access portions 87 defined by the access size.

Similarly, an overlapped axis pattern 88 may be invoked by setting the access size to greater than the stride size which signals an overlapping pattern. A repeated pattern 89 is easily obtained by setting the stride length to zero with the repetition being provided by the number of strides.

As used herein, predefined memory access pattern means a limited number of patterns that may be defined by a discrete set of pattern instructions providing a pattern type and delimiter values where the pattern may be defined prior to the calculation for which the memory access is required to be performed as opposed to memory access patterns that are a function of calculations made on the data being accessed. Autonomous as is used herein means without necessary further guidance by the processors 12 or 30.

As noted above, the lower complexity general-purpose processor 30 may also provide for barrier instructions to the stream processor 38, such instructions which block the issuance of new memory access instructions until certain previous instructions associated with a data storage resource are complete. For example, a barrier instruction (shown in Table II above) associated with a writing to the scratchpad memory 36 will block subsequent writing to the scratchpad memory 36 until all writings to the scratchpad memory 36 before the barrier instruction are completed. Barriers can also be used to signal completion of the calculation to the lower complexity general-purpose processor 30 to the extent that they indicate completion of a previous stream upon satisfaction.

TABLE II

Example Barrier Instructions

| Command Name | Parameters | Description |
| --- | --- | --- |
| SD_Bar_Scr_Rd | — | Barrier for Scratchpad Reads |
| SD_Bar_Scr_Wr | — | Barrier for Scratchpad Writes |
| SD_Bar_All | — | Barrier to wait for all commands completion |

It will be appreciated that in the absence of barrier instructions all streams would be allowed to execute concurrently. Therefore, if two streams command read and write of the same scratchpad or memory address, the semantics of that operation would be undefined. Barrier instructions allow enforcement of the memory dependencies and can be implemented by the compiler and provided in the stream instructions. This is independent of resource contention.

The lower complexity general-purpose processor 30 may also expose hardware parameters of the computer accelerator 24 including a number and type of fixed-function elements 32 and a depth of stream queue 50 for use by a compiler as is generally understood in the art.

Figure 4:
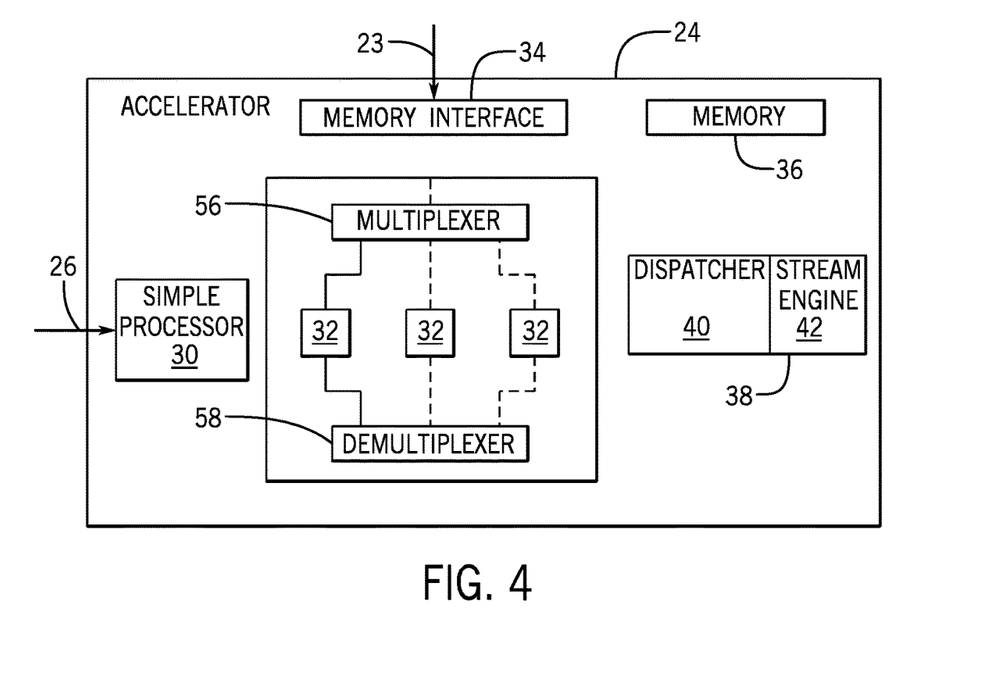
FIG. 4 is a figure similar to that of FIG. 2 showing the provision of a pool of fixed program functional elements that may be individually paired with a given stream processor.

Referring now to FIG. 4, in this architecture, a fixed-function element 32 will be associated with a single stream processor 38 and vice versa; however, the invention contemplates that the accelerator 24 may be configured to select among different fixed-function elements 32 in a configuration step using a configuration multiplexer 56 and demultiplexer 58, for example, set at time of manufacture or in a configurations step, for example, by a system driver, to select one of the fixed-function elements 32 and leave the others idle or to be used by other stream processors. In other respects, this embodiment operates identically to that described with respect to FIG. 2.

Figure 5:
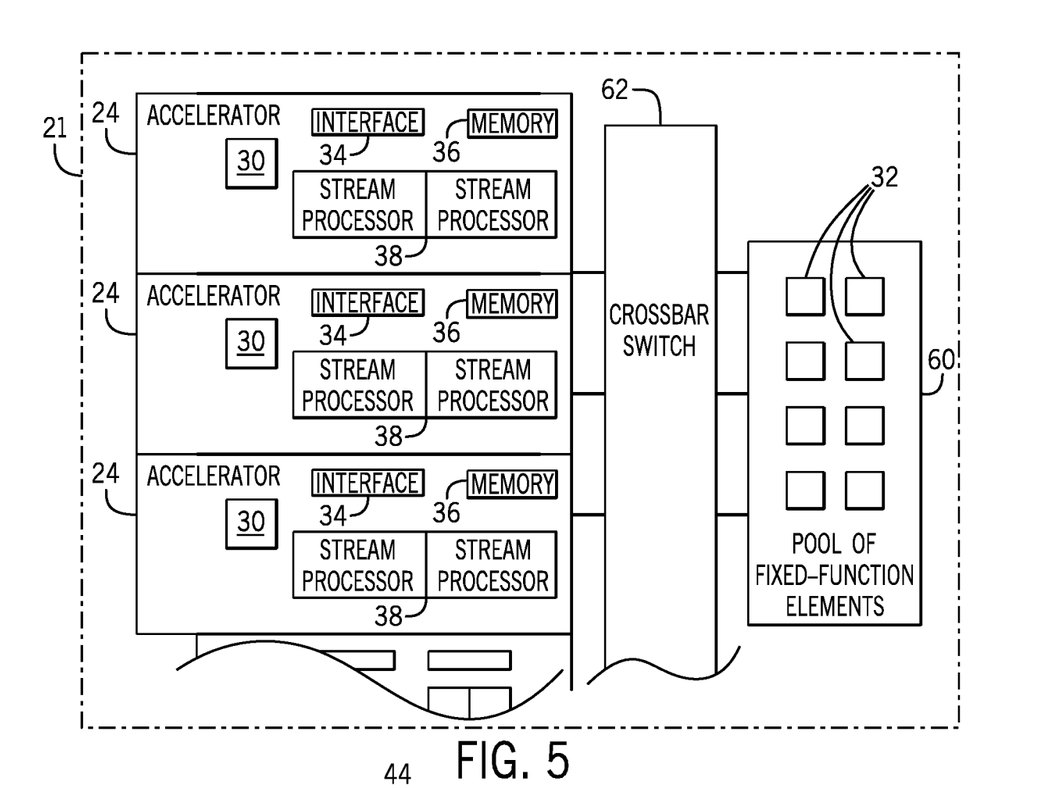
FIG. 5 is a figure similar to that of FIG. 4 showing a pooling of both stream processors and program functional elements for one-to-one pairing using a switch network.

This principle can be extended, as shown in FIG. 5, by pooling the fixed-function elements 32 in a separate pool 60 that may be connected, for example, so that any fixed-function element 32 in the pool 60 may be connected by a crossbar switch 62 to any of the different accelerators 24 which do not include internal fixed-function elements 32. In this way, improved utilization of a variety of different functional units may be had by allocating them freely among accelerators 24. Again, this configuration may be accomplished at the factory or during a configuration of the accelerators 24 prior to use and after the configuration operates essentially as the architecture of FIG. 2.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

The terms "lower complexity" and "higher complexity" refer only to relative complexity of the lower complexity and higher complexity processors and not absolute complexity. The term "fixed program functional element" refers to functional elements receiving numeric values to execute a function on those values to produce a numeric result where the function is not altered by the general-purpose processor associated with the accelerator.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to microcontroller should be understood to include any circuit capable of executing the functions described herein including but not necessarily limited to VonNeuman architectures.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A computer accelerator architecture comprising:
(1) a first von Neumann processor adapted to receive stream instructions from a second von Neumann processor, the stream instructions describing a logical stream of multiple data elements to be exchanged with a memory as input data elements and resultant output data elements;
(2) a fixed program functional element, distinct from the first von Neumann processor, to process successive of the input data elements of the logical stream, as initiated by availability of each of the input data elements, to provide the resultant output data elements of the logical stream, the fixed program functional element having fixed-function primitives interconnected in a predetermined fixed topology to provide a predetermined fixed program for processing of the input data elements to produce the resultant output data elements; and
(3) a stream processor, distinct from the first von Neumann processor and the fixed program functional element, receiving the stream instructions from the first von Neumann processor to autonomously read the input data elements of the logical stream from the memory according to the stream instructions and to autonomously write the resultant output data elements of the logical stream to the memory according to the stream instructions; and
wherein a pair consisting of only the stream processor and only the fixed program functional element operates to intercommunicate the input and the resultant output data elements of the logical stream;
wherein the second von Neumann processor has at least one of greater integrated circuit area and greater power consumption than the first von Neumann processor.

2. The computer accelerator architecture of claim 1 wherein the fixed program functional element does not include a program counter.

3. The computer accelerator architecture of claim 1 having multiple fixed program functional elements including the fixed program functional element and a switch assigning a single of the multiple fixed program functional elements at a time to the stream processor.

4. The computer accelerator architecture of claim 3 further including multiple stream processors including the stream processor and a switch switchably assigning a single of the fixed program functional elements to a single stream processor of the multiple stream processors.

5. The computer accelerator architecture of claim 1 wherein the fixed program functional element provides for processing at least thirty-two bit arguments.

6. The computer accelerator architecture of claim 5 wherein the fixed program functional element can process in parallel separate data words having a length smaller than an argument length of the fixed program functional element by concatenating the separate data words together and processing the separate data words as concatenated as an argument.

7. The computer accelerator architecture of claim 1 wherein the stream processor simultaneously exchanges multiple streams with the fixed program functional element.

8. The computer accelerator architecture of claim 7 wherein the first von Neumann processor is further adapted to receive instructions and data from the second von Neumann processor to execute logical and arithmetic instructions in response to the instructions and data to return data to the second von Neumann processor without involvement of the stream processor and the fixed program functional element.

9. The computer accelerator architecture of claim 1 wherein the stream instructions received from the first von Neumann processor by the stream processor may be received asynchronously with respect to an operation of the fixed program functional element and provide for autonomous reading of the input data elements stored in the memory or an autonomous writing of the resultant output data elements from the computer accelerator architecture according to different predefined memory access patterns.

10. The computer accelerator architecture of claim 1 wherein the stream processor provides pre-defined memory access patterns including a linear access pattern of contiguous addresses between two memory addresses and a strided access pattern of regularly spaced discontiguous addresses between two memory addresses.

11. A computer architecture comprising the following distinct elements:
(1) a first von Neumann processor communicating with a memory for receiving instructions and reading and writing data;
(2) a second von Neumann processor being distinct from and having a different design than the first von Neumann processor and adapted to receive stream instructions from the first von Neumann processor, the stream instructions describing a logical stream of multiple data elements to be exchanged with the memory as input data elements and resultant output data elements;
(3) a plurality of fixed program functional elements, distinct from the second von Neumann processor, each to sequentially process successive input data elements of the logical stream, as initiated by availability of each successive input data element, to provide the resultant output data elements of the logical stream, each of the fixed program functional elements having fixed-function primitives interconnected in a predetermined fixed topology to provide a predetermined fixed program for processing of the input data elements to produce the resultant output data elements;
(4) a plurality of stream processors, distinct from each other and from the second von Neumann processor and the fixed program functional elements, receiving the stream instructions from the second von Neumann processor to autonomously read the input data elements of the logical stream from the memory according to the stream instructions and to autonomously write the resultant output data elements of the logical stream to the memory according to the stream instructions; and
(5) an electronically controlled switch pairing a single stream processor with only a single functional element, the pair operating to intercommunicate at least some of the data elements of the logical stream.

12. The computer architecture of claim 11 wherein the fixed program functional elements do not include program counters.

13. The computer architecture of claim 12 wherein the plurality of fixed program functional elements provide multiply add-reduction functions having at least one output that is a first sum of a pair of second sums, each second sum being a sum of a pair of products, the products being products of a pair of input arguments.

14. The computer architecture of claim 12 wherein the plurality of fixed program functional elements provide a multiply accumulate function having at least one output that is a running total of a product of a pair of input arguments.

15. The computer architecture of claim 12 wherein the plurality of fixed program functional elements provide a nonlinear transformation function having an output that is a base value summed to an interpolated value, where the base value is obtained from a first lookup table from most significant bits of an input argument and the interpolated value is a slope value obtained from a second lookup table from the most significant bits of the input argument times least significant bits of the input argument.

16. A computer accelerator architecture comprising:
(1) a first von Neumann processor adapted to receive stream instructions from a second von Neumann processor, the stream instructions describing a logical stream of multiple data elements to be exchanged with a memory as input data elements and resultant output data elements;
(2) a fixed program functional element, distinct from the first von Neumann processor, to process successive of the input data elements of the logical stream, as initiated by availability of each of the input data elements, to provide the resultant output data elements of the logical stream, the fixed program functional element having fixed-function primitives interconnected in a predetermined fixed topology to provide a predetermined fixed program for processing of the input data elements to produce the resultant output data elements; and
(3) a stream processor, distinct from the first von Neumann processor and the fixed program functional element, receiving the stream instructions from the first von Neumann processor to autonomously read the input data elements of the logical stream from the memory according to the stream instructions and to autonomously write the resultant output data elements of the logical stream to the memory according to the stream instructions; and wherein a pair consisting of only the stream processor and only the fixed program functional element operates to intercommunicate the input and resultant output data elements of the logical stream;

wherein the second von Neumann processor has greater power consumption than the first von Neumann processor.

17. The computer accelerator architecture of claim 16 wherein the second von Neumann processor has greater integrated circuit area than the first von Neumann processor.

* * * * *